Dec. 24, 1963  C. D. VISOS  3,115,083
MANUAL BREAD RELEASE ASSOCIATED WITH A TOASTER HANDLE
Filed Sept. 28, 1959  2 Sheets-Sheet 1
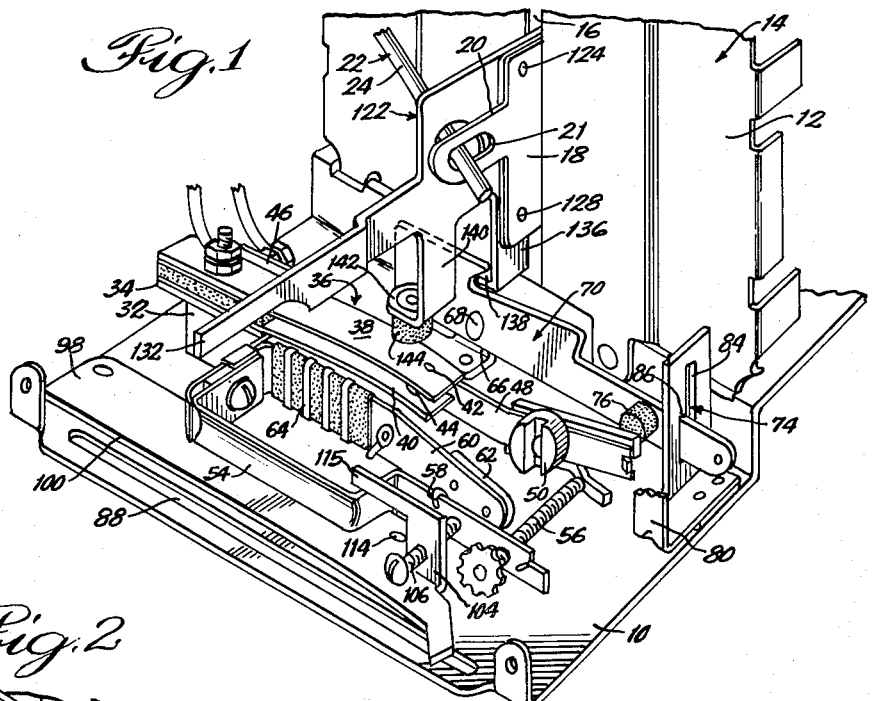
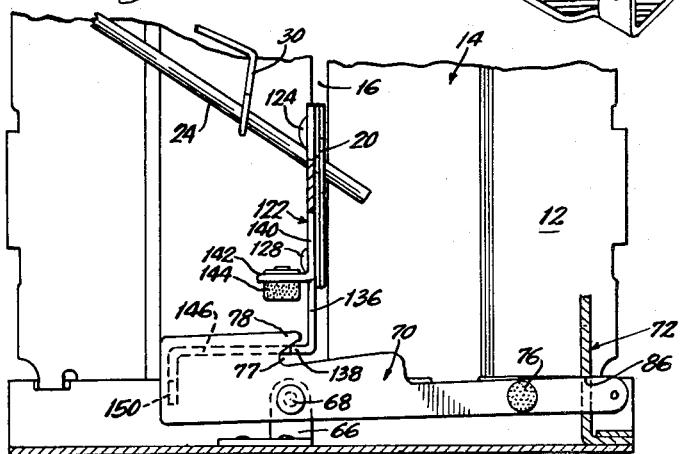
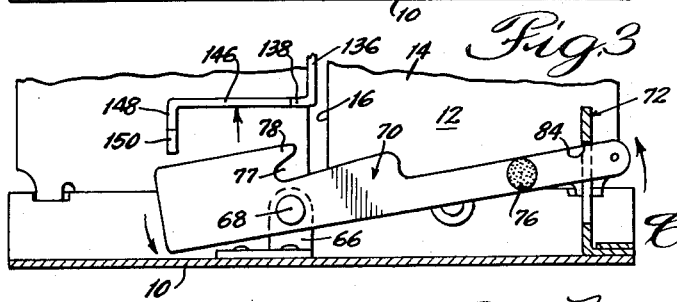
INVENTOR:
Charles D. Visos,
BY Bair, Freeman & Molinare
ATTORNEYS.

Dec. 24, 1963  C. D. VISOS  3,115,083
MANUAL BREAD RELEASE ASSOCIATED WITH A TOASTER HANDLE
Filed Sept. 28, 1959  2 Sheets-Sheet 2

INVENTOR:
Charles D. Visos,
BY Bair, Freeman & Molinare
ATTORNEYS.

United States Patent Office 3,115,083
Patented Dec. 24, 1963

3,115,083
MANUAL BREAD RELEASE ASSOCIATED WITH A TOASTER HANDLE
Charles D. Visos, St. Louis, Mo., assignor to Knapp-Monarch Company, St. Louis, Mo., a corporation of Delaware
Filed Sept. 28, 1959, Ser. No. 842,761
1 Claim. (Cl. 99—329)

This invention relates to a control mechanism for toasters and the like, and more particularly relates to a control mechanism including a mechanical latch means, a potentializable impact means for displacing the latch mechanism from its latched position, and a manual release mechanism for selectively releasing said potentialized impact means. This invention is an improvement over that disclosed in U.S. Patent No. 2,778,902.

Impact-type control switches have been used heretofore in toasters, as shown in U.S. Patents Nos. 2,545,662 and 2,778,902. In said Patent No. 2,778,902 there is disclosed a bread carrier, for a toaster, having a manual control which, when pushed downwardly, effects movement of the bread carrier to a lowered toasting position wherein the bread carrier is latched, and a timer mechanism is operative to time-out the toasting period and then effects unlatching of the carrier permitting the carrier to be raised to an elevated position. A second manual control is provided for selectively unlatching the carrier prior to the automatic unlatching effected by the timer mechanism.

One object of this invention is to provide an improved toaster of the type having an impact-type control, and which toaster is provided with a single manual control for effecting both downward movement of the bread carrier to toasting position and for selectively unlatching the carrier from its lowered, latched, position.

Another object of this invention is to provide a toaster having an impact-type control which is positioned in an end chamber of the toaster, located laterally of the toasting chamber thereof, and which is provided with a new and improved manual release mechanism for selectively releasing the impact-type control, as desired.

A further object of this invention is to provide an impact-type control for a toaster which includes a potentializable impact means which is thermally controlled for potentialization, and which normally is thereafter triggered, by engagement of the potentialized impact means with an abutment means, to transfer an impulse from the impact means to a movable latch means, and wherein a novel manual control is provided for selectively unlatching the latch means prior to the automatic unlatching which would normally occur.

Further objects and advantages will become apparent as the following description of the invention proceeds. The invention consists in the construction, arrangement and combination of the various parts of my device, whereby the objects contemplated are attained, as hereinafter more fully set forth, and as pointed out in the claim and illustrated in the accompanying drawings wherein:

FIGURE 1 is a perspective view of the interior of an end chamber of a toaster provided with an impact-type toasting-period control and provided with the improved selective manual control described herein;

FIGURE 2 is a side elevation view with certain parts omitted, illustrating the cooperation of the handle means and latch lever to effect retaining the bread carrier in lowered, toasting, position;

FIGURE 3 is similar to FIGURE 2 but shows the position of the handle and latch lever just after the parts have been unlatched and the bread carrier is starting to move toward its up position, and the arrows adjacent the parts indicate the direction of movement of the parts in going from FIGURE 2 to FIGURE 3;

Figure 4:
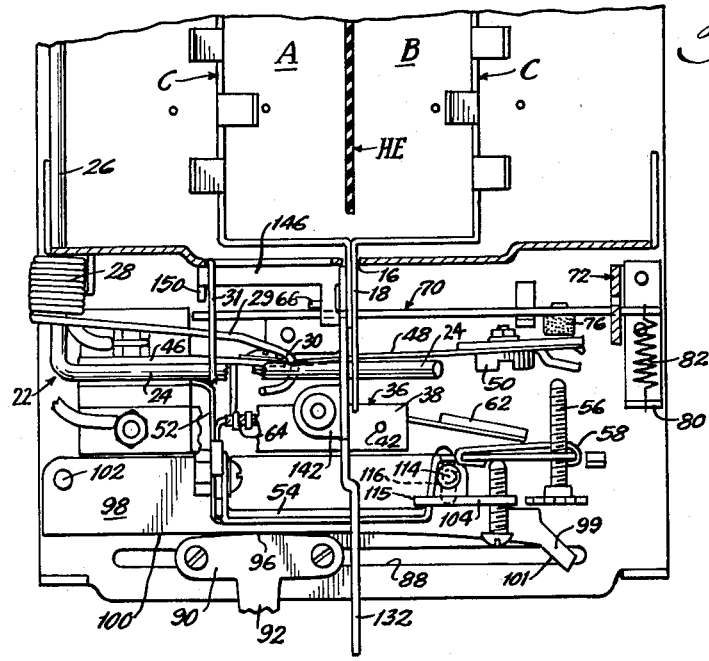
FIGURE 4 is a fragmentary top plan view of the structure seen in FIGURE 1.
Figure 5:
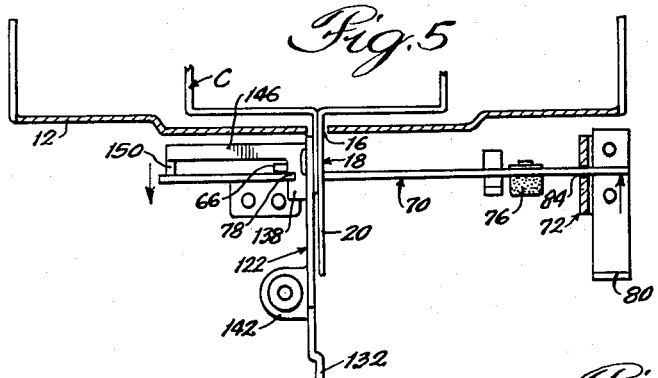
FIGURE 5 is a top plan view showing the position of parts seen in FIGURE 3, and with arrows illustrating the direction of movement of the parts to effect unlatching of the latch lever.

Referring now to the drawings, there is shown in FIGURE 1 the interior of the end portion of a toaster which includes a toaster base member 10 and an upright partition 12. It will be understood that to the right of the partition 12, as viewed in FIGURE 1, there are the toasting chambers within which the bread is toasted, and to the left of upright panel 12, as viewed in FIGURE 1, is an end chamber generally designated by the numeral 14, within which end chamber are mounted the controls of this invention.

As best seen in FIGURE 4, the bread-toasting portion of the toaster may, for example, be divided into two chambers A and B for toasting a pair of bread slices, and appropriate heating elements would be provided for toasting the bread slices in chambers A and B. In FIGURE 4, the heating element which is positioned between chambers A and B is designated at HE. The other heating elements need not be shown for the purpose of this description. There is provided, in upright panel 12, an elongated vertical passageway 16 through which extends a control arm 18 that is connected to, and moves with, a bread carriage which is shaped to define a pair of bread carriers C which are positioned in the pair of bread-toasting chambers A and B. Although only one end chamber of the toaster herein is shown, it will be understood that the opposite end of the toaster is provided with a similar upright panel through which extends a similar control arm. Each control arm 18 is provided with an extension 20, as best seen in FIGURE 1, which has a laterally elongated aperture 21 therethrough. The apertured extensions 20 cooperate with a pair of lever arms 24 which are part of a U-shaped lever bar generally indicated at 22, and the bight 26 of lever bar 22 is pivotally mounted on journal ears provided by the spaced upright panels 12. There is provided a single coil spring 28 positioned between the illustrated upright panel 12 and the adjacent arm 24 and anchored at one end to the upright partition 12 and at the other end defining a hook 30 which engages the arm 24 at a point intermediate the ends of the arm. The coil spring 28 is operative to normally bias the U-shaped lever bar 22 and the bread carriers C to the upper position. The tab 31, bent from panel 12, is positioned to engage and limit upward movement of spring arm 29 at a desired attitude. What has thus far been described is established construction and forms no part of the invention herein.

Now, some of the controls which are illustrated generally in the end chamber 14, as best seen in FIGURES 1 and 4, are of the type generally disclosed in the issued Patent No. 2,778,902. Briefly, there is provided a support bracket 32 mounted on the base 10 and which carries a second bracket 34, upon which is mounted the normally open, main energizing switch 36 of the toaster. The switch 36 includes an upper leaf spring 38, a lower leaf spring 40, and contacts 42 and 44 respectively carried by said leaf springs. Under normal conditions, and with the bread carriage in its up position, the contacts 42 and 44 are spaced apart. The bracket 32 also supports a potentializable impact means which includes a laterally extending bar 46, upon which is mounted a leaf spring 48 which carries thereon a magnet 50. There is also provided, carried on bracket 32, an angle-shaped arm 52 of resilient spring blade material. The spring arm 52 carries a relatively rigid laterally extending arm 54, which carries at the extended end thereof an adjustable, headed, abutment bolt 56. A wire-spring-type lock means 58 is provided for cooperating with bolt 56 to maintain the bolt 56 in its selected positions. The spring arm 52 also supports a laterally extending bimetal 60 which carries a magnet keeper 62 and which has a portion thereof wound with a resistance wire 64. The various parts that are mounted on bracket 32 are appropriately insulated from each other, as is well known in the art, and as is disclosed in Patent No. 2,778,902.

In addition to the foregoing, there is provided a bracket 66 mounted on base 10, which carries thereon a headed pivot pin 68, and there is provided an elongated latch lever 70 which is mounted for wobbly pivoting on the shank of pin 68. There is provided another bracket 72 mounted on the base 10 and spaced from pin 68, and the bracket 72 is shaped to define therein a labyrinth means 74 for cooperation with the extended end of the latch lever 70. The lever 70 carries an abutment member 76 against which the impact means, comprising leaf spring 48 and magnet 50 thereon, is adapted to strike. The lever 70 is shaped to define a recess 77 which is overlain by a hook element 78 for cooperation with the bread carrier in a manner as hereinafter described. A bracket 80 mounted on base 10 provides means for attachment thereto of one end of a spring 82, the other end of which connects with the extended end of lever 70. The labyrinth means 74 defines therein a first terminal edge 84, against which the lever 70 abuts when the lever 70 is in raised position as seen in FIGURE 3, and a second terminal edge 86 against which the lever abuts when the lever is in the position seen in FIGURE 2. It will be understood that the lever means thus described corresponds generally with the lever means disclosed in Patent No. 2,778,902.

Now, in the improved toaster herein disclosed, there is provided a track means in the base 10 which includes an elongated slot 88 extending over the greater portion of the width of base 10. An actuator 90 is positioned for movement along the track means which includes slot 88, and said actuator has a laterally extending arm 92 which is adapted to extend outwardly of the shell of the toaster and to have a control knob connected thereto. The actuator 90 provides a convex control edge 96. An elongated cam plate 98, having a gradually varying cam edge 100, is arranged to engage the control edge 96 of the actuator 90. The cam member 98 is pivotally mounted on base 10 by means of pivot pin 102 and the extended end of cam 98 is shaped to define an upstanding flange 104 which carries thereon an adjustable bolt 106 that is adapted to bear against the arm 54.

The actuator 90 carries a pair of spaced track followers positioned in slot 88 and adapted to engage opposite longitudinal edges of the slot 88 to maintain movement of actuator 90 along slot 88. The extended end of cam plate 98 is provided with an inclined, or release-cam, portion 99 having an inclined, or release-cam, edge 101 which makes an included angle of about 135° with edge 100. The release-cam portion 99 extends sharply relative to the remainder of cam 98 and, as seen in FIGURES 1 and 4, the cam portion 99 extends transversely across the slot 88 adjacent one end thereof, namely the end furtherest from pivot pin 102.

The cam plate 98 also carries a headed rivet 114, the shank of which cooperates with an elongated arcuate slot 116 in base 10, to permit of the necessary range of pivotal movement of cam 98, and the head of rivet 114 cooperates with the under side of base 10 to prevent the cam 98 pulling away from base 10. The upstanding flange 104 is provided with a laterally extending portion 115 which overlies a portion of the arm 54 and limits movement of the latter part which would tend to effect misalignment.

The control arm 18 of the bread carrier has thereon a handle generally indicated at 122, which is mounted for pivotal movement in a vertical plane on the shank of a headed pin 124. The handle 122 has an enlarged aperture 126 which cooperates to provide for the required range of movement between the handle 122 and arm 24, the necessity of which will become apparent hereinafter. There is provided a second headed pin 128 carried by control arm 18 and positioned below pivot pin 124. The handle 122 is provided with an elongated slot 130 for cooperation with the shank of headed pin 128, to permit of arcuate sliding movement of handle 122 relative to pin 128.

The handle 122 has the greater portion thereof positioned in the end chamber 14, but the length of handle 122 is such that an extended portion 132 thereof is positioned outwardly of a casing (not shown) which normally surrounds the toaster, and said extended end 132 of the handle is adapted to be provided with a manual control knob therefor.

Figure 6:
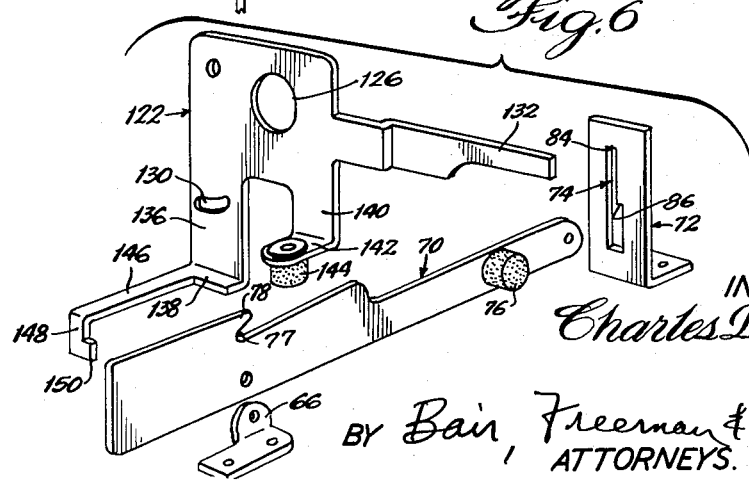
FIGURE 6 is an exploded perspective view showing more fully the handle and latch lever parts of this toaster.

As best seen in FIGURE 6, the handle 122 is provided with a first downwardly extending foot portion 136 terminating in a laterally extending flange 138. There is also provided a second downwardly extending foot portion 140, having a laterally extending flange 142 at the lower end thereof, and the flange 142 carries thereon a ceramic switch closing element 144. Extending laterally of the flange 138 is an extension 146, which is positioned between lever 70 and panel 12 and which is adapted to normally engage the upright panel 12, and the extension 146 has a downwardly depending foot 148 and an abutment 150 extending away from panel 12.

In the operation of the device herein disclosed, the handle portion 132 which extends outwardly of the toaster's casing is manually engaged after bread has been deposited on one or both of bread carriers C, and the handle 122 is depressed, thereby causing the carriage C to move downward toward the toasting position. As the handle 122 moves downwardly, the ceramic button 144 engages the upper leaf 38 of switch 36 and causes deflection thereof to close the switch 36 to initiate energization of the heating elements in the toaster. At substantially the same time, the flange 148 engages a portion of the upper edge of latching lever 70 to the side of flange 78, since lever 70 is normally in the position shown in FIGURE 3, and further downward movement of handle 122 depresses the lever 70 along a first traverse portion (the vertical portion) of the labyrinth means 74. When the lever 70 is moved into alignment with a second traverse portion (the horizontal portion) of the labyrinth means 74, the spring 82 is operative to pivot the lever 70 about its wobble mounting on pin 68, to swing the lever to the position shown in FIGURES 1 and 2, thereby restraining the lever 70 in a latching position. In the movement of the lever 70 to the lowered position of FIGURE 2, the hook 78 on lever 70 is swung laterally above the flange 138 from the position of FIGURE 3 to the position seen in FIGURE 2, so that when the handle 122 is released, the hook 78 engages flange 138, thereby restraining the carriage C in the lowered toasting position.

Simultaneously with the energization of the heating elements of the toaster, and by the closing of the switch 36, the heater 64 wrapped around bimetal 60 is energized and the heat therefrom causes the thermally responsive bimetal 60 to warp in the direction of the magnet 50, and this continues until the magnet keeper 62 and the magnet 50 effect contact by reason of proximity and magnetic force developed therebetween. Immediately upon contact between keeper 62 and magnet 50 there is established a short circuit from bimetal 60 to spring blade 48, which reduces the heating effect of heater 64, and this permit bimetal 60 to cool, thereby swinging the bimetal back toward its original position. Such movement by the bimetal bends the leaf spring 48, thereby potentializing said member, and when the extended end of member 48 engages and abuts the tip of bolt 56 further movement of member 48 is halted, and then, as the bimetal 60 continues to cool, suddenly a point is reached where the forces tending to separate keeper 62 and magnet 50 are greater than the magnetic forces, and then keeper 62 and the magnet 50 separate, or are triggered, thereby releasing the potentialized leaf spring 48 which swings against the ceramic abutment 76 to dislodge the lever 70 from the position shown in FIGURE 1 and 2 into alignment with the first traverse portion of the labyrinth 74. The mechanism thus far described constitutes a timing means, of the type disclosed in Patent No. 2,778,902, for automatically timing-out the period of toasting.

The spring 82 is inclined so that a portion of the force thereof automatically effects movement of the lever 70 to its first restrained position, as shown in FIGURE 3, in abutment with the edge 84; and the swinging of the latch lever 70 to the position shown in FIGURE 3 effects release of flange 138, thereby permitting the spring 28 to raise the toasting carriage C to the elevated position. This operation corresponds with that disclosed in the Visos Patent No. 2,778,902.

By reason of the presence of spring member 52, the member 54 is spring-biased against the extended tip of adjustment bolt 106, thereby spring-biasing the cam plate 98 against the actuator 90. It will be observed that, by lateral movement of the actuator 90, the position at which the extended end of leaf spring 48 engages the tip of abutment bolt 56 is varied, thereby changing the period of time lapsing between the time of first closing of switch 36 to the time when the potentialized leaf spring 48 is released to effect unlatching of the latch lever 70, and by this means the period of toasting is varied to select the color of the toast desired. By moving the actuator 90 to the full right-hand position, the actuator 90 engages the inclined portion 99 of the cam 98 and thrusts the cam sharply forward an amount sufficient for the abutment bolt 56 to force the extended end of leaf spring 48 against the abutment member 76, to effect selective release of the latch lever 70 prior to the termination of the normal toasting period.

The handle 122 provides means for selectively effecting discontinuation of the toasting period and raising of the bread carrier C to its elevated position prior to the termination of the normal toasting period. When in the lower latched position as shown in FIGURES 1 and 2, and if a party wishes to raise the bread carriage prematurely, the party lifts upwardly on the extended end 132 of handle 122, thereby pivoting handle 122 about the axis of pin 124, within the range permitted by the elongated slot 130. Such movement causes the abutment portion 150 of handle 122 to engage the portion of the lever 70 located laterally of the wobble pin 68, and causes the lever to wobble about wobble pin 68 in a horizontal plane so as to move the extended end of latch lever 70 along the second traverse portion of the labyrinth means 74, and away from engagement with the abutment 86, and into alignment with the first traverse portion of labyrinth means 74, which is in vertical alignment with abutment edge 84, whereupon the spring 82 again exerts its influence on latch lever 70 to cause same to move upwardly to the position shown in FIGURE 3, thereby releasing the carriage C from its lowered position and to permit spring 28 to immediately restore the carriage C to its raised position and simultaneously opening switch 38 to terminate the toasting cycle.

While there has been shown and described a particular embodiment of this invention, it will be obvious to those skilled in the art that various changes and modifications may be made therein without departing from the invention and, therefore, it is intended in the appended claim to cover all such changes and modifications as fall within the true spirit and scope of the invention.

What I claim as new, and desire to secure by Letters Patent of the United States is:

A latching means for a toaster of the type having a movable bread carrier that is manually movable from an elevated position to a lowered toasting position wherein a toasting cycle is automatically timed-out after which the carrier is automatically restored to its elevated position; said latching means comprising, in combination: an elongated latching lever positioned transversely of the directions of movement of said carrier and being normally biased toward an unlatching position; a handle normally spaced from said latching lever and connected to and movable downwardly toward said latching lever with said carrier, a first portion of said handle being positioned to engage said lever, as said carriage moves downwardly toward toasting position, and to move said lever toward a latching position, and a second handle portion positioned to be located laterally of said lever when the carrier is in toasting position; means for releasably retaining said lever in its latching position including cooperating engaging and overlying elements on said lever and handle for latching said carrier in the toasting position; said handle being pivotally connected to said carrier and said cooperating latching elements on said lever and handle being relatively movable to permit upward pivotal movement of said handle relative to said carrier when said carrier is in toasting position, said handle when so pivoted relative to the carrier, when the carrier is in toasting position, being operative to have said second handle portion engage and move said lever laterally, while the lever maintains latching cooperation with the handle, to release said lever from its latching position, whereupon said latching lever releases the carrier from toasting position.

References Cited in the file of this patent

UNITED STATES PATENTS

| | | |
|---|---|---|
| 2,285,156 | Gomersall | June 2, 1942 |
| 2,517,697 | Molmans | Aug. 8, 1950 |
| 2,537,408 | Hansen | Jan. 9, 1951 |
| 2,541,207 | Cole | Feb. 13, 1951 |
| 2,584,725 | McNairy | Feb. 5, 1952 |
| 2,771,022 | Hollister | Nov. 20, 1956 |
| 2,778,902 | Visos | Jan. 22, 1957 |